428-1

SR 12-23-75 XR 3,928,658

United States Patent [19]

van Boxtel et al.

[11] B 3,928,658

[45] Dec. 23, 1975

[54] METHOD OF PROVIDING TRANSPARENT CONDUCTIVE ELECTRODES ON A TRANSPARENT INSULATING SUPPORT

[75] Inventors: Antonius Marinus van Boxtel; Cornelis Jan Gerritsma, both of Eindhoven, Netherlands

[73] Assignee: U.S. Philips Corporation, New York, N.Y.

[22] Filed: Apr. 25, 1973

[21] Appl. No.: 354,510

[44] Published under the Trial Voluntary Protest Program on January 28, 1975 as document no. B 354,510.

[30] Foreign Application Priority Data

Apr. 28, 1972 Netherlands ...................... 7205767

[52] U.S. Cl. ................. 427/108; 29/25.17; 29/625; 156/8; 156/11; 156/22; 313/513; 340/336; 350/160 LC; 427/109; 427/110; 428/1; 428/209; 428/220; 428/472

[51] Int. Cl.² .......................................... H05K 3/02

[58] Field of Search...... 340/336, 324 R; 313/109.5; 350/160 LC; 117/211, 5.5, 212, 217; 29/625, 25.17; 156/8, 11, 22; 161/DIG. 7; 427/108, 109, 110; 428/1, 209, 220, 472; 428/1, 209, 220, 472

[56] References Cited

UNITED STATES PATENTS

| | | | |
|---|---|---|---|
| 3,076,727 | 2/1963 | Harwig | 117/211 |
| 3,210,214 | 10/1965 | Smith | 117/5.5 X |
| 3,443,915 | 5/1969 | Wood et al. | 117/211 X |
| 3,537,925 | 11/1970 | Chen | 117/5.5 X |
| 3,620,795 | 11/1971 | Kiba | 117/5.5 |
| 3,702,723 | 11/1972 | Borden | 350/160 LC |

*Primary Examiner*—David L. Trafton
*Attorney, Agent, or Firm*—Frank R. Trifari; Leon Nigohosian

[57] ABSTRACT

A method of providing patterns of transparent conductors for displays, with solderable contact pads which consist of layers of different materials. A metal auxiliary layer is used in which a negative reproduction of the desired pattern of conductors and pads is provided. After providing the conductive layers necessary for the pattern, the excessive parts thereof are removed by the selective dissolution of the metal auxiliary layer. The method is of particular importance when patterns of conductors are used having one or more materials which cannot be etched or can be etched with difficulty only.

13 Claims, 3 Drawing Figures

METHOD OF PROVIDING TRANSPARENT CONDUCTIVE ELECTRODES ON A TRANSPARENT INSULATING SUPPORT

The invention relates to a method of manufacturing a device comprising a transparent insulating support which is provided with a pattern of conductors of a transparent conductive material, and to devices manufactured by using such a method.

As is known, transparent insulating supports provided with transparent electrodes are used inter alia in displays.

For example, in displays operating with liquid crystals or with electrolytic cells in which luminescence in the visible part of the spectrum occurs when electric current passes through, transparent electrodes, often of indium oxide, tin oxide or copper iodide, are used. Said transparent electrodes are to be connected to other parts of the electric circuit, for which purpose a connection plug is usually placed on the ends of said electrodes. Another possibility is to make the ends of the electrodes solderable by painting each of the contact places separately with a silver paste. In this case the contact places must usually be comparatively far apart, either in connection with the dimensions of the connections plug, or to prevent the formation of short-circuits upon making solderable and/or upon soldering.

The present invention now enables the provision of transparent patterns of conductors in which all the contact places are simultaneously made solderable, the term "making solderable" being understood to mean within the scope of the invention the provision of a metal layer on which electric connections can be made by means of the known connection methods, such as soldering, thermo-compression bonding and ultrasonic welding.

This simultaneous making solderable of the contact places means not only an important simplification of the method of manufacturing devices having such patterns of conductors, but it also provides the possibility of grouping the contact places more closely together, with smaller mutual distances, in which said mutual distance can even be chosen to be so small that, for example, integrated circuits for the electric control of the display can be mounted directly on the "solderable" contact places, for example, with a direct-contact method.

According to the invention, a method of the type described in the preamble is characterized in that a metal layer which has one or more recesses in the form of the pattern of conductors to be provided, is provided on the support as an auxiliary layer, a transparent conductive layer being provided on the auxiliary layer and in the recesses in the support, a part of the surface of the transparent conductive layer being provided with a solderable metal layer, a pattern of conductors being obtained by the selective dissolution of the auxiliary layer and consisting for one part of a transparent layer only and consisting for another part of several layers among which at least one lowermost, support-adjoining transparent layer and one "solderable" layer.

It is of importance that a metal auxiliary layer be used. Many metals are available in a sufficiently pure form and can be provided in a comparatively simple manner, for example, by vapour-deposition or sputtering.

Furthermore, selective etchants for a large number of metals, alloys included, are known for patterning and/or removing. In patterning, the conventional photolithographic masking layers can be used. After the etching treatment, said masking layer may be removed thoroughly so that no organic residues remain on the surface which, as is known, may often cause adhesion problems.

An elevated substrate temperture may be used without objection in vapour-depositing the conductive layer for the pattern of conductors. At the said elevated temperature also, which is often necessary to improve the adhesion of the conductor pattern to the substratum, the metal auxiliary layer is non-deformable and stable and, for example, it seldom or never shows a tendency to cracking and/or becoming brittle. In addition, the metal auxiliary layer can also be removed without problems after a treatment at elevated temperature, this in contrast with photo-lacquer layers in which a thorough removal in these circumstances is often difficult.

Otherwise, an important advantage of the method according to the invention is that there exists a greater freedom in the choice of the substrate temperature during the provision of the conductive layer for the pattern of conductors. This substrate temperature is of great influence on the adhesion of the pattern of conductors to the insulating support.

In the method according to the invention, the conductive layer contacts the insulating support only in those places where the pattern of conductors is ultimately desired. The adhesion between the conductive layer and the metal auxiliary layer during the removal plays substantially no part, because the removal is not carried out by etching away the conductive layer but by dissolving the underlying auxiliary layer. When the metal auxiliary layer is provided, a lower substrate temperature will usually be sufficient because the most important requirement imposed upon the adhesion between the auxiliary layer and the insulating layer is that it is sufficient to accurately pattern the auxiliary layer.

Dissolving of the metal auxiliary layer, in spite of said layer being covered at least for the greater part by the conductive layer, can be carried out comparatively rapidly because, in choosing the solvent, the adhesion of a (photolithographic) etching mask and controlling the extent of underetching need not be taken into account, so that in that case a rapidly acting etchant may be used, while in addition a primary cell is easily obtained in that the materials of the auxiliary layer and the conductive layer which differ from each other but are both conductive, are simultaneously and in direct electric contact with each other in the solvent. With a suitable choice of the two materials, the dissolution of the auxiliary layer can thus be considerably accelerated.

This same effect of the accelerated dissolution by the formation of primary cell may occur in the etching of patterns of conductors which consist of a composite layer. Underetching of the lowermost conductive layer than easily and readily occurs as a result of which, notably in the case of fine patterns of conductors, serious difficulties arise. Since the lowermost conductive layer is usually covered by an opaque layer, the extent of underetching is not visible and hence substantially unreliable. The result is a relatively high reject percentage in the production.

When using the method according to the invention in which the conductive layer is not patterned by etching the layer, these problems caused by underetching do not occur.

A further preferred embodiment of the method according to the invention is characterized in that a metal auxiliary layer is used having a thickness which is at least equal to that of the conductive layer. The thickness of the auxiliary layer is preferably larger than that of the conductive layer. In this manner, the conductive layer at the area of the edges of the recesses in the metal auxiliary layer will be extremely thin or even entirely interrupted, so that the removal of the excessive parts of the conductive layer is facilitated.

The invention will now be described in greater detail with reference to a few embodiments and the accompanying drawing, in which.

Figure 1:
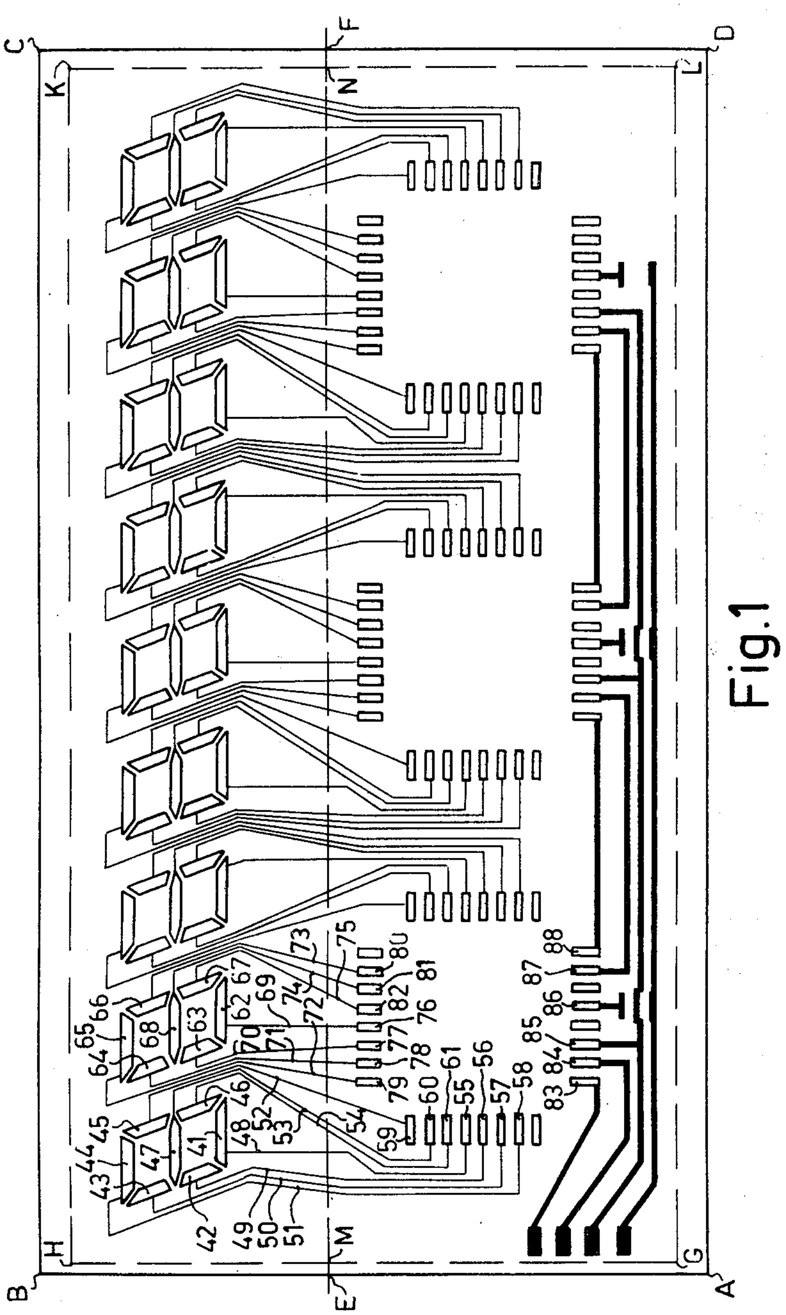
FIG. 1 is a diagrammatic plan view of a transparent support comprising a pattern of conductors manufactured by using the invention.

The method of manufacturing displays according to the invention of which one of the possibilities will be described in greater detail hereinafter with reference to the embodiment, generally comprises the following steps:

a metal auxiliary layer, for example of aluminium, having therein a negative reproduction of the desired pattern of conductors is provided on a transparent support, for example, of glass or synthetic material, which auxiliary layer can be obtained, for example by etching;

a transparent conductive layer of, for example, tin oxide, indium oxide or copper iodide is provided on the auxiliary layer containing the pattern, the conductive layer being provided, for example, by spraying or sprinkling with a salt solution from which the conductive oxide can be obtained, by sputtering, by vapour-deposition or sputtering of the metal in an oxygen atmosphere, or another usual method;

on a part of the transparent conductive layer within which at least the places of the desired "solderable" contact places are present, a conductive layer is provided which consists of one or more metal layers and of which at least the last, namely the uppermost, consists of a metal on which connections can be made by means of one of the known connection methods, such as soldering, thermo-compression bonding or ultrasonic welding. Such a layer which enables the use of said connection methods is hereinafter briefly referred to by the name of "solderable" layer. Usually, an intermediate layer will be necessary between the transparent layer and the "solderable" layer to obtain a good adhesion and/or to prevent disturbing chemical reactions or the formation of disturbing connections between the materials of the transparent and the "solderable" layer. Dependent upon the connection method chosen, for example, a layer of nickel-chromium succeeded by a layer of nickel or a layer of chromium succeeded by a layer of gold may be used. The metal layers may be provided, for example, by vapour-deposition or sputtering and be etched away from the part of the transparent layer to be left uncovered. Vapour-deposition or sputtering is preferably carried out through a mask or the part of the transparent layer to be left uncovered is screened with a mask or masking layer present thereon. The non-transparent layers of the conductive layer may be provided, for example, also entirely or partly electro-chemically.

After providing the "solderable" metal layer in this manner, the auxiliary layer is dissolved, for example, by a treatment with lye, in which at the same time the excessive parts of the conductive layer work loose from the support and only the desired patter of conductors is left.

In this manner the transparent support is provided with a pattern of conductors the conductor tracks of which consist only partly of transparent conductive material, e.g., tin oxide or indium oxide or copper iodide and for another part of, for example, three layers which are provided one on top of the other and which consist, for example, of tin oxide, indium oxide or copper iodide, nickel-chromium or chromium and nickel or gold.

When soldering is used as the connection method, in which the uppermost layer of the pattern of conductors may consist, for example, of nickel, the contact places may be provided with solder in one operation. For example, the support may be at least partly dipped in liquid solder. Solder is then left only on the nickel surface.

The thickness of the auxiliary layer may be varied within comparatively wide limits. A suitable thickness is, for example, approximately 0.15 $\mu$m. In order to check disturbing reflections and hence to obtain a maximum transparency, the thickness of the transparent layer is preferably chosen to be approximately one quarter of the wavelength of the radiation to be passed. Good results are obtained in practice with a thickness between approximately 0.05 and 0.15 $\mu$m. The thickness of the nickel-chromium adhesive layer preferably is between approximately 0.1 $\mu$m and maximally approximately 0.3 $\mu$m, the nickel layer preferably having a thickness larger than approximately 0.15 $\mu$m. Good results were obtained with a nickel layer having a thickness between approximately 0.15 and 0.35 $\mu$m.

The removal of the aluminium layer is preferably carried out by an etching treatment with lye, in particular sodium hydroxide solution. The dissolution of the auxiliary layer can be accelerated by locally leaving the auxiliary layer uncovered, for example at the edge, or locally removing the conductive layer before the treatment with lye.

Hydrogen peroxide is preferably added to the lye solution. It has been found that conductor tracks of better quality can then be obtained. Presumably, during the treatment with lye without the addition of hydrogen peroxide, some reduction of tin oxide to tin or of indium oxide to indium occurs and said reduction is suppressed by the presence of hydrogen peroxide in the solution. In this connection it is to be noted that, when the transparent layer is not provided from a (warm) solution but, for example, by sputtering, the aluminium auxiliary layer is preferably oxidized to a small extent, for example, by heating to approximately 400°C for approximately 1 hour. The thus formed oxide skin prevents the conductive layer from being reduced by the underlying aluminium.

The thickness of the conductive layer and notably of the "solderable" layer is preferably restricted. For example, the thickness of the nickel layer is smaller than 1 $\mu$m and preferably not larger than 0.3 to 0.4 $\mu$m. It is achieved in this manner that the conductive layer during and/or after the dissolution of the aluminium layer still easily breaks where necessary at the edges of the recesses of the auxiliary layer. If desired, in connection with the connection method chosen, the "solderable" layer after dissolving the auxiliary layer, can be further reinforced, for example, by electroless deposition. The thickness of a reinforced nickel layer preferably lies between approximately 1 and 5 $\mu$m. If desired, a further layer, for example, a gold layer, may be provided on the nickel layer. Soldering without a flux can be carried out, for example, on a nickel layer which is covered with 0.1 $\mu$m gold.

In the embodiment, a nine-digit pattern as shown diagrammatically in FIG. 1 is provided on a 2 mm thick plate of pyrex glass (dimensions 94 × 46.5 mm). Each digit is composed of seven segments (picture electrodes) in which the smallest distance between adjacent segments 41 to 47 is, for example, approximately 50 $\mu$m. Each segment is connected, by means of a narrow conductive track (in the Figure the conductive tracks for one digit are referenced 48 to 54), to a "soldering contact" (in the Figure the soldering contacts for one digit are referenced 55 to 61). For a second digit the segments (picture electrodes), the narrow conductive tracks and the soldering contacts are referenced in the Figure as follows: segments 62 to 68; the thin conductive tracks 69 to 75 and the soldering contacts 76 to 82.

In the finished digit pattern according to the example the picture electrodes consist of transparent conductive tin oxide. The parts of the narrow conductive tracks above the line E—F also consist of transparent conductive tin oxide. The parts of the narrow conductive tracks below the line E—F and the soldering contact in the finished digit pattern are built up according to the example from three layers: on the tin oxide layer provided on the glass plate is present a nickel-chromium layer (thickness approximately 0.2 $\mu$m) having on top a nickel layer (thickness approximately 0.2 $\mu$m).

One set of soldering contacts (for one set referenced 83 to 88) for connection to the supply lines (shown in the Figure as wide dark tracks) is present on the glass plate per three-digits.

The method according to the example consists of the following operations.

The glass plate is cleaned and exposed to a glow discharge. An aluminium layer of approximately 0.25 $\mu$m thickness is then vapour-deposited on the plate at a pressure of $10^{-5}$ to $10^{-6}$ Torr. A usual positive photolacquer is provided on the aluminium layer; the lacquer layer is dried. The lacquer is exposed via a positive photomask; said lacquer is then hardened by heating at 130°C for 10 minutes. The exposed parts of the photolacquer are dissolved by means of a developer. The exposed aluminium is etched away at room temperature with dilute phosphoric acid. The photolacquer is then removed, for example, with acetone. Rinsing with water and drying at approximately 100°C is then carried out. A glass plate is now available which is provided with a negative pattern (i.e., the auxiliary layer) in aluminium of the digit pattern to be manufactured.

Of the glass plate the size of which is denoted in the figure by the rectangle ABCD, the part beyond the rectangle GHKL is covered. The assembly is then heated in a furnace at approximately 430°C and then sprayed with a warm solution (approximately 100°C) of 20% by weight of tin chloride ($SnCl_4$) in butyl acetate. The part of the glass plate within the rectangle is covered with a layer of transparent electrically conductive tin oxide.

The glass plate is then placed in a vacuum bell jar. The part beyond the rectangle GMNL is covered. First a layer of nickel-chromium (thickness approximately 0.2 $\mu$m) is vapour-deposited on the non-covered part succeeded, likewise by vapour-deposition in a vacuum, by a layer of nickel (thickness approximately 0.2 $\mu$m).

After removing the glass plate from the vacuum bell jar it is transferred to a solution of 1 N potassium hydroxide solution containing, for example, 2.5% to 3% by weight of hydrogen peroxide. Reduction of tin oxide during the etching treatment is checked by the addition of hydrogen peroxide so that the aluminium can be etched away faster with a comparatively strong lye solution. Since the part of the glass plate beyond the rectangle GHKL is not covered with tin oxide, nickel-chromium or nickel, the lye has ready access to the aluminium layer and said layer and hence also the layers present thereon are removed. After etching with lye the plate is rinsed with water and then dried at room temperature.

In the described manner a digit pattern is obtained of which the segments (electrodes) of the digits and the parts of the narrow conductive tracks (which connect segments and soldering contacts) above the line E—F consist of transparent electrically conductive tin oxide and the parts of the narrow conductive tracks below the line E—F and the contact places consist of layers built up from successive layers of transparent electrically conductive tin oxide, nickel-chromium and nickel.

In a manner similar to that described, a digit pattern can be manufactured in which the parts of the a narrow conductive tracks below the line E—F and the contact places consist of layers which are built up from successive layers of transparent electrically conductive tin oxide, chromium and gold. In that case, chromium is vapour-deposited instead of nickel-chromium and gold is vapour-deposited instead of nickel. The chromium layer is then, for example, approximately 500 A thick and the gold layer, for example, approximately 300 A thick. After dissolving the auxiliary layer, a layer of nickel having a thickness between, for example, 1 and 5 $\mu$m may be provided, for example by electroless deposition, on the gold layer.

All the contact places may be "tin-plated" in one operation by dip soldering, the plate being dipped in molten solder, for example, consisting of 95% by weight of lead and 5% by weight of tin, at approximately 350°C over such a distance that the contact places are provided with solder.

After providing solder on the contact places, integrated circuits for controlling the segments (picture electrodes) can be secured on it. Said integrated circuits may incorporate, for example, circuits to convert information which becomes available, for example, in a binary code, into signals which can be supplied to the picture electrodes so as to visualize said information in the digit patterns. The contact places of the integrated circuits themsolves, that is to say the contact places of the semiconductor body of said circuits may be constituted, for example, by so-called "bumps" or also by "beam leads." These may be connected directly to the contact places on the insulating support. When integrated circuits with "beam leads" are used, the latter usually consisting of gold, a thicker layer of gold, for example of 1 μm, may be provided on the 500 A thick chromium layer, or, after dissolving the auxiliary layer, the gold layer may be reinforced, for example, to an overall thickness between 1 and 10 μm. The "beam leads" may be connected to said gold layer by thermocompression bonding.

Digit patterns manufactured according to the method of the invention are new, as are the displays manufactured with them. The invention therefore also includes transparent insulating supports which are provided with digit patterns the segments (picture electrodes) of which are transparent and electrically conductive and of which the parts of the narrow conductive tracks which connect the segments to the soldering contacts also consist of a transparent electrically conductive layer and of which the soldering contacts and possibly parts of the said narrow conductive tracks adjoining the soldering contacts are constructed from a transparent electrically conductive layer, a nickel-chromium layer and a nickel layer, or from a transparent, electrically conductive layer, a chromium layer and a gold layer.

The invention also includes displays manufactured by using such supports with such digit patterns.

Figure 2:
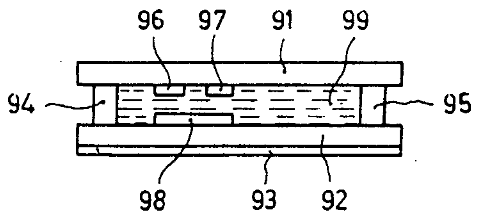
FIG. 2 is a diagrammatic cross-sectional view of a display in which the support shown in FIG. 1 is used.

The structure of a display cell may become apparent from FIG. 2 which is a cross-sectional view of the cell. In this Figure, 91 and 92 denote parallel plates of 2 mm thick pyrex glass, 93 is a mirroring aluminium layer, 94 and 95 are so-called "spacers" consisting of glass plates or insulating plates of synthetic material of a given thickness to space the electrodes 96, 97 and 98 at a given distance. For this purpose a foil of a synthetic material may also be used. 96 and 97 denote segments (picture electrodes) of a digit, 98 is a counter electrode. The cell shown operates on nematic liquid crystals 99.

Figure 3:
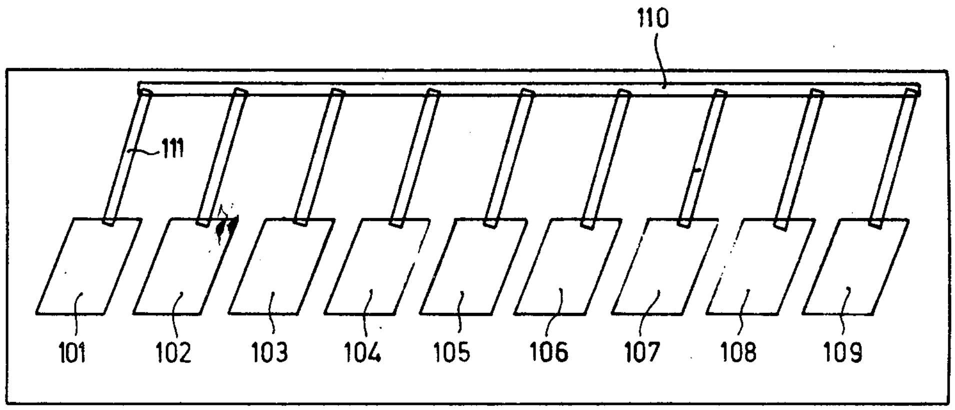
FIG. 3 is a diagrammatic plan view of a second transparent support of the display shown in FIG. 2.

FIG. 3 shows a glass plate which is provided with the counter electrodes of the digits. Each counter electrode (the electrodes are referenced 101 to 109) corresponds in shape and dimension with a digit consisting of seven segments (see in FIG. 1, for example, the segments 41 to 47). Each counter electrode consists of a transparent electrically conductive layer, for example, tin oxide, indium oxide or copper iodide. Each counter electrode is electrically connected to a common contact 110 by means of a conductive track which may also consist of transparent electrically conductive tin oxide, indium oxide or copper iodide. For example, counter electrode 101 is connected to contact 110 by means of the conductive track 111. Mirroring counter electrodes may also be used which may consist, for example, of aluminium.

It will be obvious that the invention is not restricted to the examples described, but that many variations are possible to those skilled in the art without departing from the scope of this invention. For example other materials may be used. In addition to the already mentioned aluminium, copper and silver for the auxiliary layers are to be considered, for example, magnesium, manganese, lead and indium.

When the thickness of the conductor tracks is such that the breaking at the edges of the recesses may run off with greater difficulty than is desired, the uppermost layer or layers of the conductive layer may be patterned entirely or over part of their thickness by means of a further mask. Besides by vapour deposition or sputtering, the various layers may also be provided, for example, electro-chemically, in which it is possible, for example, after the dissolution of the auxiliary layer, to further reinforce the pattern of conductors by "electroless" deposition and/or to provide one or more further layers of a different conductive material. So in this manner the "solderable" layer may also be provided after first a pattern of conductors has been obtained by means of the auxiliary layer and the dissolution thereof.

What is claimed is:

1. A method of producing a device comprising a transparent insulating support which is provided with a pattern of conductors of a transparent conductive material comprising the steps of:

a. forming on said support auxiliary layer comprising a metal layer containing at least one recess corresponding to said pattern of conductors;
b. forming a transparent conductive layer on said auxiliary layer and in each said recess;
c. forming a solderable metal layer on a part of the exposed surface of said transparent conductive layer; and
d. selectively dissolving said auxiliary layer so as to remove said auxiliary layer and the portion of said transparent conductive layer overlying said auxiliary layer, said conductor pattern comprising a first part having only a transparent layer and a second part having multiple layers comprising both at least one lowermost, support-adjoining transparent layer and one solderable layer therabove.

2. A method as in claim 1, wherein said auxiliary layer has a thickness which is at least equal to the thickness of said conductive layer.

3. A method as in claim 1, wherein said auxiliary layer consists essentially of a member selected from the group of aluminum, copper, silver, and magnesium.

4. A method as in claim 1, wherein said transparent conductive layer consists essentially of a member from the group of tin oxide, indium oxide and copper iodide.

5. A method as in claim 1, wherein said solderable layer consists essentially of nickel and a nickel-chromium layer is provided between said transparent conductive layer and said nickel solderable layer.

6. A method as in claim 1, wherein said solderable layer consists essentially of gold and a chromium layer is provided between said transparent conductive layer and said gold solderable layer.

7. A method as in claim 6, wherein said transparent electrically conductive layer uses a thickness between 0.05 and 0.15 microns and said multiple layer further comprises a chromium layer having thickness between 0.01 and 0.1 microns disposed on said transparent conductive layer and a gold layer having a thickness between 0.01 and 0.1 microns disposed on said chromium layer.

8. A method as in claim 1, wherein said auxiliary layer is covered only partly by said multiple layers.

9. A method as in claim 1, wherein said auxiliary layer consists essentially of aluminum and said auxiliary layer is subsequently etched with lye.

10. A method as in claim 9, wherein said auxiliary layer consists essentially of aluminum and has a thickness between 0.1 and 1 microns.

11. A method as in claim 9, wherein said aluminum auxiliary layer is etched with a solution containing lye and hydrogen peroxide.

12. A method as in claim 9, wherein said transparent conductive layer has a thickness between 0.05 and 0.15 microns and said multiple layer further comprises a nickel-chromium layer having a thickness of at most 0.3 microns disposed on said transparent conductive layer and a nickel layer having a thickness between 0.15 and 0.35 microns disposed on said nickel-chromium layer.

13. A device comprising a pattern of conductors, produced according to the method defined in claim 1.

* * * * *